Figure 1:
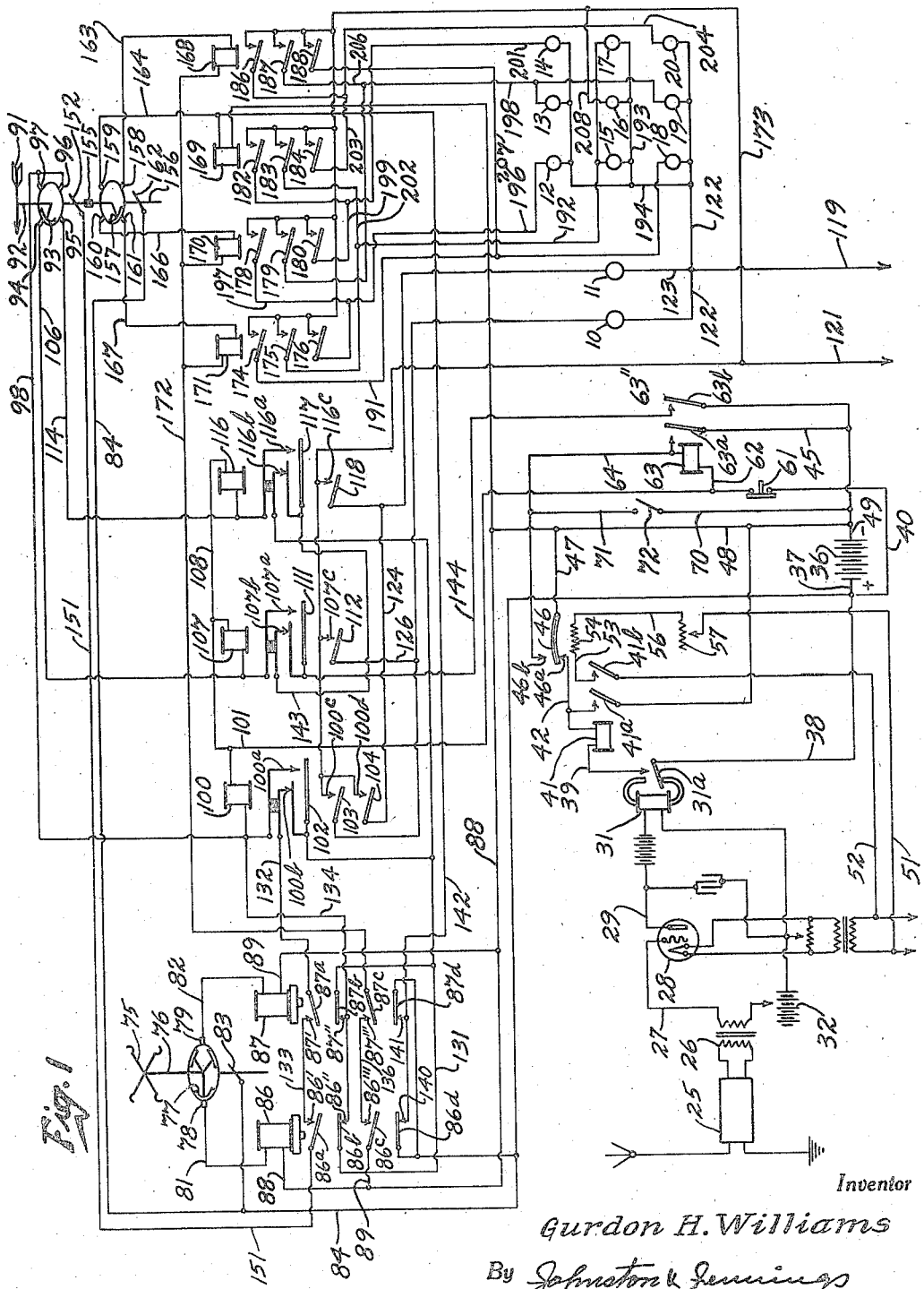

Aug. 25, 1936.                G. H. WILLIAMS                 2,052,333
              LIGHTING CONTROL APPARATUS FOR AIRDROMES
                      Filed Oct. 3, 1929        3 Sheets-Sheet 1

Inventor
Gurdon H. Williams
By Johnston & Jennings
Attorneys

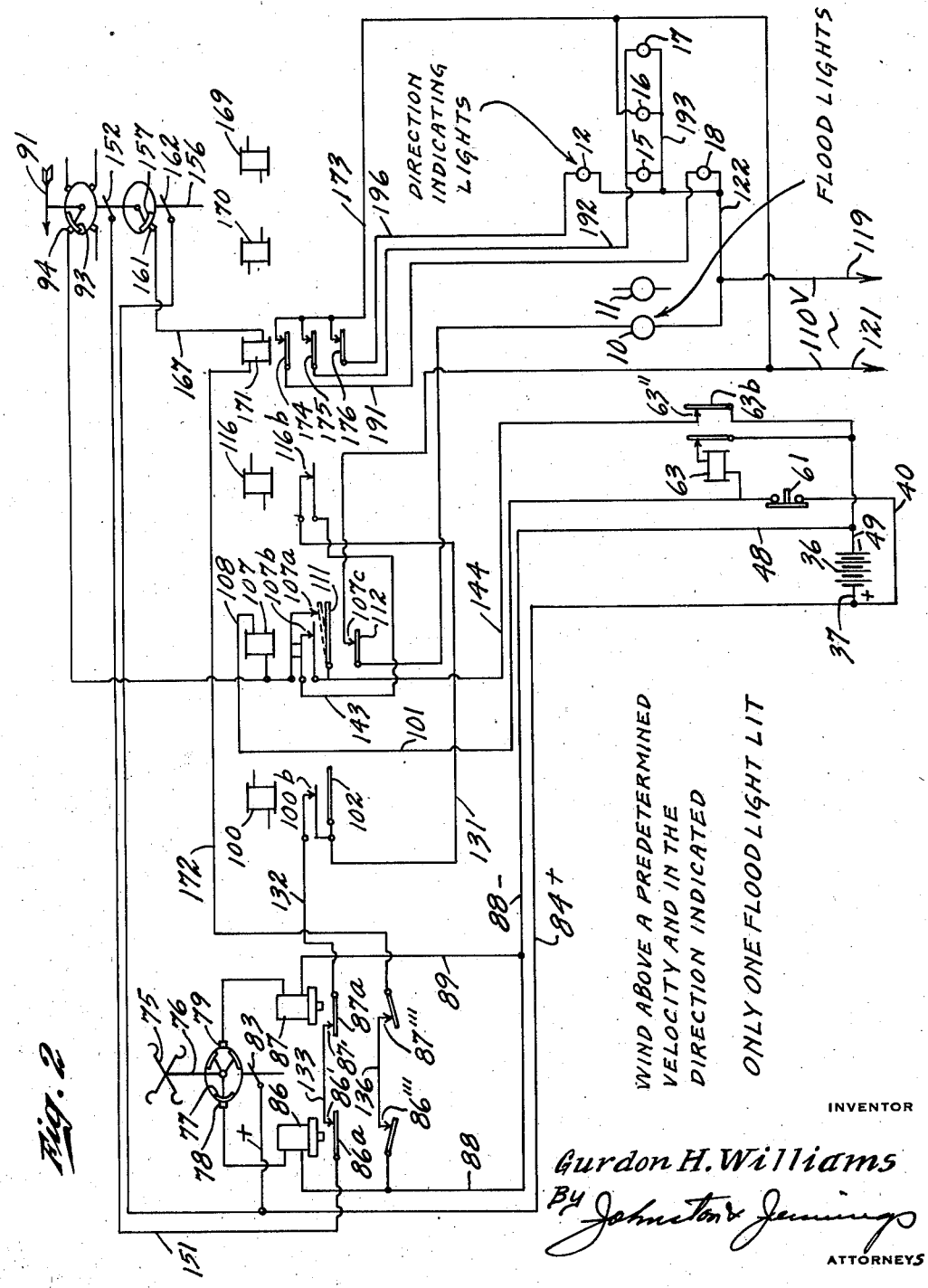

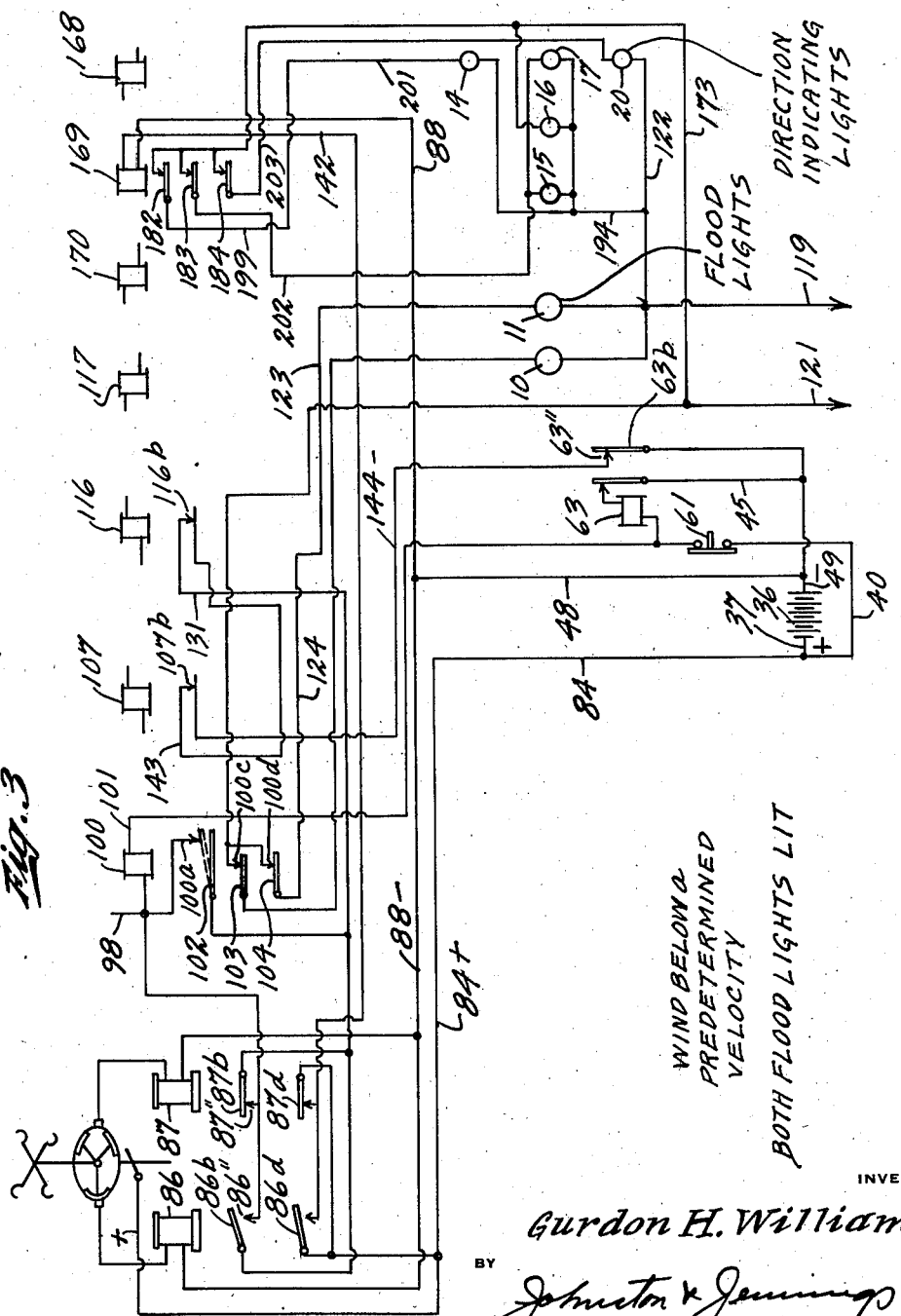

Patented Aug. 25, 1936

2,052,333

UNITED STATES PATENT OFFICE 2,052,333

LIGHTING CONTROL APPARATUS FOR AIRDROMES

Gurdon H. Williams, Birmingham, Ala.

Application October 3, 1929, Serial No. 397,134

9 Claims. (Cl. 177—352)

My invention relates to apparatus for indicating conditions affecting aerial navigation at airdromes, and has for its object the provision of apparatus which shall be operable from a remote point by a radiant energy signal.

A further object of my invention is to provide apparatus for indicating conditions affecting aerial navigation, which shall be operable in response to a radiant energy signal and which shall include means whereby the apparatus is unaffected by stray signals.

A still further object of my invention is to provide a lighting system for airdromes including a master control circuit which shall be closable from a remote point in response to a radiant energy signal and when so closed the indications shall remain unchanged until the circuit is manually opened.

Another object of my invention is to provide lighting apparatus for airdromes including various lights and groups of lights for indicating wind direction and safe direction of approach for airplanes and in which the indications of said lights are automatically controlled by wind direction modified by wind speed.

A particular object of my invention is to provide means whereby the lights for indicating wind direction and for illuminating a landing field may be selectively and automatically controlled and may be put into operation by an aviator before landing through the medium of a radiant energy signal. With such an arrangement, it will be apparent that the necessity of maintaining lights and operators therefor at an airdrome through all hours of the night is obviated and that the expense of a continuously lighted system is avoided.

In the carrying out of my invention, as herein described, I provide the airdrome with suitable lights for indicating wind direction and flood lights for illuminating the landing field, though it will be apparent that any desired system of lights may be employed. The circuits for the lights which indicate wind direction and the flood lights are selectively and automatically controlled by means responsive to wind direction, such as a wind vane, and means responsive to wind velocity, such as an anemometer. The circuits controlling the flood lights are operated from a master control circuit which, when closed, permits the automatic operation above referred to.

The master control circuit is operable by means responsive to a radiant energy signal from a remote point and means are included whereby such a signal must be of a predetermined sustained duration, thereby obviating possible closing of the master control circuit by stray radiant energy signals. Furthermore, there is included in the master control circuit a relay which operates after the circuit is once closed to hold it closed until it is opened manually, thereby insuring that the lights will remain on until a landing has been made.

Apparatus embodying features of my invention is shown in the accompanying drawings, forming a part of this application wherein Figure 1 is a diagrammatic drawing of the circuits and lighting arrangements together with their controlling means.

Fig. 2 is a diagrammatic view showing circuits which may be energized with wind in direction indicated and only one flood light lit; and Fig. 3 is a diagrammatic view showing circuits which may be energized when no wind is blowing and with both flood lights lit.

Referring to the drawings for a better understanding of my invention, I show a pair of flood lights 10 and 11 for lighting a landing field, though any suitable number may be employed. As is well understood in the art to which my invention relates, airports are generally provided with a plurality of such flood lights, arranged around the landing field, which are lighted singly, or at times more than one flood light is lighted, to afford general illumination of the field when an airplane is landing or taking off. In all cases, they are lit so as to afford such illumination without causing a glare in the eyes of the aviator. In appropriate position on or near the field are located a plurality of wind direction indicating lights, in this instance nine being shown and numbered from 12 to 20 inclusive. It will be noted that the wind direction indicating lights are arranged in squares whereby the usual T-outline of lights may be made for indicating wind direction. With the number of lights shown, four different directions of the wind at 90° to each other may be indicated though it will be obvious that by increasing the number of lights and providing appropriate circuits as hereinafter explained, the number of indications may be increased accordingly.

The control, both of the flood lights 10 and 11 and of the wind direction indicating lights 12 to 20 inclusive, is automatically maintained through a plurality of secondary circuits which will be described later. The major portion of the secondary circuits are under the control of a master control circuit which will first be described, it being understood that when the master control circuit is closed, the secondary circuits controlled thereby may automatically and selectively be closed and while the master control circuit is open, all of the secondary circuits controlling the flood lights are open.

At 25 I show a conventional radio receiving set, the audio frequency output of which passes through a transformer 26, to the grid circuit 27 of a vacuum tube 28. The plate circuit is shown at 29 and includes therein a relay 31 controlling an armature 31a. The grid circuit 27 is normally so biased by a battery 32 that the current in the plate circuit 29 is too low to operate the relay 31. When an incoming radiant energy signal passes through the receiver 25, it affects the grid bias so as to increase the current in the plate circuit 29 and energizes the relay 31 to move the armature 31a.

When the relay 31 is energized, a circuit is made from a battery 36 through a conductor 37, a conductor 38, armature 31a, and conductor 39 to a relay 41 which controls armatures 41a and 41b. The circuit continues through the relay 41, energizing it, thence through a conductor 42 to a bi-metallic temperature responsive member 46 movable between contacts 46a and 46b. In the position shown, the bi-metallic member is in contact with the contact 46a so that the circuit being described continues through the bi-metallic member 46 to a conductor 47 and from thence to a conductor 48 and a conductor 49 back to the battery 36.

At 51 and 52 are shown conductors which are connected to a suitable source of relatively high voltage such as 110 volt, 60 cycle current. With the relay 41 energized a high voltage circuit is made through conductor 52, armature 41b, and from thence through a conductor 53 to a heating element 54 which is disposed adjacent the bi-metallic member 46. From the heating element 54 the circuit continues through a conductor 56 to a rheostat 57 which controls the flow of high voltage current through the circuit and from thence back to the conductor 51. The heating element 54 raises the temperature of the bi-metallic member 46 causing it to move toward the contact 46b. As soon as the bi-metallic member 46 leaves the contact 46a, a holding circuit is established through the relay 41 from conductor 37, through conductor 38, armature 31a, conductor 39, relay 41, armature 41a and conductors 48 and 49 back to battery 36.

As soon as the bi-metallic member 46 has been heated sufficiently to move into contact with the contact 46b, a circuit is completed from battery 36 through conductor 37, and conductor 40 to a push button 61, the latter being of the type which is normally closed but which may be held open manually. From the push button 61 the circuit continues through a conductor 62 to a master relay 63 which controls armatures 63a and 63b. From the relay 63 the circuit continues through a conductor 64 to the contact 46b and thence through bi-metallic member 46, conductors 47, 48 and 49, back to the battery 36.

As soon as the circuit just described has been closed, a master control circuit through the relay 63 is established from the battery 36 through conductor 37, conductor 40, push button 61, conductor 62, master relay 63, armature 63a, and from thence back to battery 36 through conductors 48 and 49. It may thus be seen that once the closing of the master control circuit is brought about by the movement of the bi-metallic member 46 into contact with the contact member 46b, the master relay 63 is energized and holds the master control circuit closed through the armature 63a and once it is closed, it can not be reopened until the push button 61 is manually operated.

In order that the master relay 63 may be energized, and the master control circuit closed, when desired, without operation of the radio receiving set 25, I provide conductors 70 and 71 connected respectively to the conductors 49 and 64 and which may be connected by means of a manually operable switch 72.

It will be noted that in order to complete the master control circuit in response to a radiant energy signal through the receiving set 25, it is necessary that the signal be continued or sustained for a sufficient duration for the relays 31 and 41 to remain energized a sufficient length of time for the heating element 54 to raise the temperature of the bi-metallic member 46 sufficiently to cause it to move into contact with the contact 46b. The time required for this movement to take place may be adjustably controlled by means of the rheostat 57.

It will be seen therefore that my improved apparatus is not operable in response to stray radiant energy signals such as might at any moment affect the receiving set 25 but the signal must be one of a predetermined sustained duration. It will furthermore be seen that should a sustained signal of less than the predetermined duration bring about energization of the relays 31 and 41, and cause the bi-metallic member 46 to start its movement toward the contact 46b, and not move sufficiently to come in contact with the contact 46b, the relays 31 and 41 can not again become energized until the bi-metallic member 46 has cooled off sufficiently for it to again come in contact with the contact 46a. It will thus be seen that my improved apparatus is well guarded against any operation other than an intended operation and that the master control circuit will remain open until such intended operation. When the master control circuit is once closed, the secondary circuits for the flood lights are automatically and selectively completed in a manner which will now be described.

At 75 is shown an anemometer having a shaft 76 and a commutator 77, the segments of which alternately contact with brushes 78 and 79 connected to conductors 81 and 82 respectively. A brush 83 bears against the anemometer shaft 76 and is connected to a conductor 84 leading to the plus side of battery 36 through conductor 37. The conductor 81 leads to a relay 86 and the conductor 82 leads to a relay 87, both of which relays are of the "slow to release" type. The relay 86 controls armatures 86a, 86b, 86c and 86d while the relay 87 controls armatures 87a, 87b, 87c and 87d. Connected to the other side of the relay 86 is a conductor 88 which is connected through conductor 48 to the conductor 49 from the minus side of the battery 36. The relay 87 connects to the battery 36 through a conductor 89 connected to the conductor 88.

With the commutator 77 of the anemometer 75 in the position shown, the relay 86 is energized from the battery 36 through conductors 37 and 84 through brush 83 and anemometer shaft to the commutator 77. From thence it continues through brush 78, conductor 81, relay 86, conductor 88 and back to battery 36 through conductors 48 and 49. When a segment of the commutator 77 moves into contact with the brush 79, the relay 87 is energized through conductors 37 and 84, brush 79, conductor 82, relay 87, conductor 89, back to the conductor 88 and conductors 48 and 49 to the battery. It will thus be seen that with a wind blowing and the anemometer rotating, the relays 86 and 87 are alternately energized. These relays being of the slow to release type, with a wind of a predetermined minimum velocity, both relays remain energized. If the velocity of the wind falls below such a minimum, the relays 86 and 87 alternately release their associated armatures. The segments of the commutator 77 are so arranged that with no wind blowing, one of the segments will be in contact with the brush 78 or 79.

At 91 I show a wind vane having a shaft 92 and a commutator 93 which is adapted to contact with one of four brushes 94, 95, 96, and 97, respectively, though it will be apparent from a further understanding of my invention that any desired number may be provided. In the instance shown, the brushes 96 and 97 are connected through a conductor 98 which leads to a relay 100 which is connected to the battery 36 through a conductor 101, push button 61 and conductors 87 and 46. The relay 100 controls armatures 102, 103, and 104, the armature 102 being movable into contact with a flexible contact member 100a. The flexible contact member 100a has connected thereto another flexible contact member 100b through which a circuit is normally made. When the relay 100 is energized a circuit is first made through armature 102 and flexible contact 100a, followed by a breaking of the circuit through the flexible contact 100b. The armatures 103 and 104 are adapted to be moved into contact with stationary contacts 100c and 100d, respectively.

The brush 94 of the wind vane 91 is connected through a conductor 106 with a relay 107 which latter is connected through a conductor 108 to the conductor 101, and thence in a manner already described to the battery 36. The relay 107 controls armatures 111 and 112. The armature 111 is movable into contact with a flexible member 107a similar to the contact 100a and which has connected thereto a flexible contact member 107b to form a "make before break" contact as previously described. The armature 112 is adapted to be moved into contact with a stationary contact member 107c.

The brush 95 of the wind vane 91, leads through a conductor 114 to a relay 116 which is connected to the conductor 108 and from thence to the battery in a manner already described. The relay 116 controls armatures 117 and 118. The armature 117 is movable into contact with a flexible contact member 116a having connected thereto a normally closed flexible contact member 116b to form a "make before break" contact. The armature 118 is adapted to be moved into contact with a stationary contact member 116c.

At 119 and 121 are shown conductors connected to a suitable lighting circuit such as 110 volt, 60 cycle alternating current. The conductor 121 is connected to the stationary contact members 100c, 100d, 107c, and 116c. The conductor 119 is connected to a conductor 122 and a conductor 123 leading respectively through the flood lights 10 and 11. The conductor 123 is connected to the armature 118 directly and through a conductor 124 to the armature 104. The conductor 122 is connected directly to the armature 103, and through a conductor 126 to the armature 112.

It will thus be seen that when the relay 100 is energized, closing the contacts 100c and 100d, a circuit is completed through both the flood lights 10 and 11 through the conductors 121, contacts 100c and 100d, conductors 126 and 124, conductors 122 and 123, to conductor 119. When the relay 107 is energized a circuit is completed through flood light 10, through conductors 119, 122, contact 107c and conductor 121. When relay 116 is energized, a circuit is completed through the flood light 11 through conductor 123, contact 116c and conductor 121.

It is well understood that flood lights, such as 10 and 11, at airports, are lighted when an airplane is landing or taking off so as to furnish general illumination of the landing field being traversed by the airplane, without producing a glare in the eyes of the aviator. Ordinarily flood lights are so located about an airport that one or more may be lit so that the source of the beam is to the rear or to one side of the direction in which the airplane is landing or taking off. Inasmuch as the number and location of flood lights depends upon the shape and conditions surrounding each particular airport, I have not shown, except conventionally, nor do I claim, any particular arrangement or order in which such flood lights are to be lighted. My invention is particularly directed to a system of control whereby appropriate flood lights are lighted automatically in accordance with direction for landing indications, responsive jointly to wind direction and wind velocity, which system of control will now be described further.

The armatures 86b, 87b, 102, and flexible contact 116b are all connected to a common conductor 131. The armature 87a and the flexible contact 100b are connected by means of a conductor 132. When the relay 86 is energized, the armature 86a moves into contact with a stationary contact member 86' which is connected to a stationary contact member 87', associated with the relay 87, through a conductor 133. When the relay 87 is energized, the armature 87a moves into contact with the stationary contact member 87'. The armature 86b, when the relay 86 is de-energized, is in contact with a stationary contact member 86'', while the armature 87b, when the relay 87 is de-energized, is in contact with a stationary contact member 87''. The contact members 86'' and 87'' are connected by means of a conductor 134 which in turn is connected to the conductor 98 leading to the wind vane 91. The armature 86c, when the relay 86 is energized, moves into contact with a stationary contact member 86''' which is connected to a stationary contact member 87'''' by means of a conductor 136. The armatures 86d and 87d, when the relays 86 and 87 are de-energized, are in contact with stationary contacts 140 and 141, both of which are connected to a conductor 142 leading to the wind direction indicating apparatus to be described later.

The flexible contact member 107b and the armature 117 are connected by means of a conductor 143. The armature 111, controlled by the relay 107 is connected through a conductor 144 to a stationary contact member 63'' which is closed by the armature 63b when the relay 63 is energized.

Assuming now that the master control circuit through the relay 63 has been caused to be closed by a sustained radiant energy signal, as previously described, and that a wind of sufficient velocity is blowing to maintain both the relays 86 and 87 energized, a circuit is made as follows:

From battery 36 through conductor 49 to armature 63b and thence through stationary contact member 63'' through conductor 144 and flexible contact 107b, through conductor 143 to flexible contact member 116b. From the flexible contact member 116b the circuit continues through conductor 131 to the armature 102 and flexible contact member 100b and from thence through conductor 132 to armature 87a. Both relays 86 and 87 being energized, the circuit continues from armature 87a to stationary contact 87' and thence through conductor 133 to stationary contact 86'. From the stationary contact 86' the circuit continues through armature 86a through a conductor 151 to a brush 152 bearing against the wind vane shaft 92. With the wind vane in the position shown, the circuit continues through the shaft 92, the segment 93 and brush 94, through the conductor 106 to the relay 107 energizing said relay and continuing through conductor 108 to conductor 101 and from thence back through push button 61 to conductors 40 and 37, to the battery 36.

When the relay 107 is energized, the armature 111 moves into contact with the flexible contact 107a before breaking the contact 107b. As soon as contact is made with the contact member 107a, a holding circuit for the relay 107 is established from the conductor 144 through the armature 111 and contact 107a, the relay 107, conductor 108, and thence through conductor 101 and back to battery 36 as previously described. Once the holding circuit, just described, is completed, a sudden change in wind direction does not affect a de-energization of the relay 107. When the relay 107 is energized, the armature 112 also comes in contact with the stationary contact member 107c, completing a circuit through flood light 10 as heretofore described.

Since it is possible to de-energize relay 63 only by pressing the push button 61, and since a holding circuit has been established for the relay 107, controlled from the master relay 63, the circuits just described will remain completed and the flood light 10 will remain on until the push button 61 is pressed. When the push button 61 is pressed, the relay 63 is de-energized, breaking the circuit to relay 107 through the armature 63b and the circuit through the flood light 10 is opened. The operation of the relays 100 and 116 is the same as that described for the relay 107, the circuits being completed through these relays when the wind vane 91 is in the proper position for the commutator 93 to contact with the brushes 95, 96, or 97, as the case may be. When the relay 100 is energized, a circuit is completed through both flood lights 10 and 11, as already described, and when the relay 116 is energized, a circuit is completed through the flood light 11 only, as already described.

Should there be no wind blowing, or a wind of such low velocity that only one of the relays 86 and 87 is energized, and assuming that the master control circuit is closed, a circuit is made through conductor 144, contact member 107b, conductor 143, to contact 116b. From thence the circuit continues through the conductor 131 to armatures 86b and 87b, and thence through contact 86'' or 87'', depending upon which of the relays 86 and 87 is energized, thence to conductor 134 and conductor 98.

From conductor 134 the circuit goes through relay 100, energizing it and thence back through conductor 101 to push button 61 and conductors 40 and 37 to the battery 36. Once the circuit is made through the relay 100, energizing it, a holding circuit is established through the armature 63b and contact 63'' through conductor 144, contact 107b, contact 116b, conductor 131, contact 100a, and relay 100 back through conductor 101 to the battery 36 as previously described.

When the relay 100 is energized, armatures 103 and 104 are pulled into contact with the stationary contact members 100c and 100d which closes the circuits through both flood lights 10 and 11 as heretofore described, lighting the field for safest landing.

The means for indicating the wind direction will now be described. Connected to the wind vane shaft and insulated therefrom by a sleeve 155 is a commutator shaft 156 having a segmental commutator 157 secured thereto and adapted to selectively bear against brushes 158 to 161 inclusive, depending upon the direction of the wind. The four brushes are arranged at uniform distances around the commutator so as to allow an indication of four wind directions at 90° to each other though it will be apparent that any desired number may be provided.

Bearing against the commutator shaft 156 is a brush 162 which is connected to the conductor 84, which latter is also connected to the brush 83 bearing against the anemometer shaft 76. Leading from the brushes 158 to 161, respectively, are conductors 163, 164, 166, and 167. The conductor 163 leads to a relay 168, the conductor 164 to a relay 169, the conductor 166 to a relay 170, and the conductor 167 to a relay 171. The relays 168, 170, and 171 are connected in parallel to a conductor 172 leading to the armature 87c. The relay 169 is connected in parallel with the relays 86 and 87 through conductor 98 which is connected to the battery 36 through conductors 48 and 49.

Controlled by the relay 171 are armatures 174, 175 and 176, adapted when the relay 171 is energized to be brought into contact with cooperating stationary contact members connected in parallel. Controlled by the relay 170 are armatures 178, 179, and 180 adapted to be brought into contact with similar stationary contact members connected in parallel when the relay 170 is energized. Controlled by the relay 169 are armatures 182, 183, and 184 which are brought into contact with associated stationary contact members connected in parallel when the relay 169 is energized. Similarly the relay 168 controls armatures 186, 187 and 188 which are brought into contact with associated stationary contact members when the relay 168 is energized. All of the stationary contact members just mentioned are connected to a single conductor 173 leading to the conductor 121 of the lighting circuit.

Connected to the armature 174 is a conductor 191 which leads through wind direction indicating light 18 to a conductor 122 connected to the conductor 119. The armature 175 is connected to a conductor 192 leading through the wind direction indicating lights 16 and 17 to a conductor 193 which latter is connected through a conductor 194 to the conductor 122, and thence to the lighting circuit. The armature 176 is connected to a conductor 196 which leads through the wind direction indicating light 12 to a conductor 194, and thence to the lighting circuit.

The armature 178 is connected to a conductor 197 which is connected to the conductor 196 leading through the wind direction indicating light 12 as just described. Armature 179 is connected to a conductor 198 which leads through the wind direction indicating light 13 to the conductor 194 and also through wind direction indicating light 19 to the conductor 122 and the lighting circuit. The armature 180 is connected to a conductor 199 which latter is connected to a conductor 201 leading through the wind direction indicating light 14 to the conductor 194, and thence to the lighting circuit.

The armature 182 associated with the relay 169 is also connected to the conductor 201 and through the wind direction indicating light 14. The armature 183 is connected to a conductor 202 which latter is connected to the conductor 192 leading through the wind direction indicating lights 15 and 17 to the lighting circuit. The armature 184 is connected to a conductor 203, which latter is connected to a conductor 204 leading through the wind direction indicating light 20 to conductor 122 of the lighting circuit.

The armature 186 associated with the relay 168 is also connected to the conductor 204 and the light 20 as just described. The armature 187 is connected to a conductor 206 which latter is connected to the conductor 198 leading through the wind direction indicating lights 13 and 19 to the lighting circuit. The armature 188 is connected to a conductor 207 which latter is connected to the conductor 191 leading through the wind direction indicating light 18 to the lighting circuit. Inasmuch as the wind direction indicating light 16 forms a part of every direction indication, it is connected directly across the lighting circuit from conductor 173 through a conductor 208 to the conductor 193 and remains lit at all times.

The operation of the wind direction indicating lights is as follows: Assuming that there is a wind of sufficient velocity for the anemometer 75 to hold both the relays 86 and 87 energized and that the wind direction is that indicated by the wind vane 91 with the commutator segment 157 bearing against the brush 161 leading to the relay 171, a circuit is made from battery 36 through conductor 49 to conductor 48 and thence through conductors 88 and 89 to stationary contact 86'''. From thence it continues through conductor 136, stationary contact 87''' and conductor 172 to relay 171. From relay 171 the circuit continues through conductor 167 to brush 161, segment 157, shaft 156 and brush 162 to conductor 84 and thence through conductor 37 to the other side of the battery 36. This energizes relay 171 and brings the armatures 174, 175, and 176 into contact with their associated stationary contact members. When this is done the lighting circuit is completed through wind direction indicating lights 18, 15, 17, and 12, in a manner already described. Inasmuch as the light 16 is always on, there is thus outlined automatically a standard T indication of the wind direction.

The energization of the relays 168, 169, and 170 is brought about similarly to that of relay 171, the particular relay being energized depending entirely upon the wind direction and the brush with which the commutator segment 157 is in contact. Whichever relay is energized, a T is outlined through the completion of circuits through the proper direction indicating lights 12 to 20 inclusive to indicate to the pilot the proper direction for landing.

Assuming now that there is no wind blowing, or a wind of such low velocity that only one of the relays 86 and 87 is energized, a circuit is made through relay 169 which is connected directly to the negative side of the battery 36 through conductors 88, 48 and 49. From the relay 169 the circuit proceeds back to battery 36 through the conductor 142 to one of the armatures 86d or 87d, depending upon which relay 86 or 87 is de-energized. The armatures 86d and 87d are both connected to the conductor 84 so that the circuit continues through conductors 84 and 37 to the plus side of the battery 36. When the relay 169 is energized as just described, the armatures 182, 183, and 184 are brought into contact with their associated stationary contact members and lighting circuits are completed through wind direction indicating lights 14, 15, 16, 17, and 20 outlining a T to indicate to the pilot the safest direction for landing on the field with no wind, or a light wind blowing.

From the foregoing description it will be apparent that I have devised an airdrome lighting system which includes a master control circuit which may be closed both in response to a radiant energy signal or in response to the manual closing of an associated circuit. It will be seen that once the master control circuit is closed, secondary circuits are selectively and automatically established under the control of the wind velocity and wind direction responsive means. The provision of automatic holding circuits for both the master control circuit and the secondary circuits insures that once the flood light are set for a pilot to land on the field, the indications will remain the same until the circuits are broken by manual operation of the push button 61.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In an airdrome lighting system, a plurality of sets of lights arranged to indicate wind direction, a set of lights arranged to indicate safest direction for landing with wind below a predetermined minimum velocity, circuits for each set of lights, a separate relay controlling the circuits for each set, a circuit for energizing each relay, a wind vane and an anemometer, means operated by the wind vane and anemometer for controlling the energizing circuits of the relays, whereby a set of lights will be lighted to indicate the direction of the wind in the presence of a wind above a predetermined velocity, and the selected set of lights will be lighted to indicate safest direction for landing in the absence of a wind of the said predetermined velocity.

2. In an airdrome lighting system, a plurality of sets of lights arranged to indicate wind direction, a set of lights arranged to indicate safest direction for landing with wind below a predetermined minimum velocity, circuits for each set of lights, a separate controlling means for each of the circuits, a wind direction indicating means, a wind velocity indicating means, and means operated by the wind direction and wind velocity indicating means for actuating the circuit controlling means, whereby a set of lights will be lighted to indicate the direction of the wind in the presence of a wind above a predetermined velocity and the selected set of lights will be lighted to indicate safest direction for landing in the absence of a wind of the said predetermined velocity.

3. In an airdrome lighting system, a plurality of sets of lights arranged to indicate wind direction, a set of lights arranged to indicate safest direction for landing with wind below a predetermined minimum velocity, circuits for each set of lights, a separate relay controlling the circuits for each set, a circuit for energizing each relay, a pair of relays of the slow to release type having normally closed control elements in series in the circuits for energizing the first mentioned relays, circuits for the pair of relays, a wind vane, means operated by the wind vane for selectively closing the circuits for energizing the relays controlling the wind direction indicating sets of lights, an anemometer, and means operated by the anemometer for successively opening and closing the circuits for the pair of relays responsive to wind velocity whereby a set of lights will be lighted to indicate the direction of the wind in the presence of a wind above a predetermined velocity and the selected set of lights will be lighted to indicate safest direction for landing in the absence of a wind of the said predetermined velocity.

4. In an airdrome lighting system, a plurality of lights wired in sets to indicate wind direction, a set of lights wired to indicate safest direction for landing with wind below a predetermined minimum velocity, circuits for each set of lights, a separate relay controlling the circuits for each set of lights, circuits for the relays, a wind vane, circuit closing means operated by the wind vane interposed in the relay circuits associated with the sets of lights indicating wind direction, an anemometer, a pair of relays of the slow to release type associated with the anemometer, circuits for these relays, means operated by the anemometer for alternately opening and closing the latter circuits whereby both relays remain energized with the wind above a predetermined minimum velocity, and a plurality of circuits controlled by the last mentioned relays and interconnected with the circuits for the first mentioned group of relays, whereby a set of lights will be lighted to indicate the direction of the wind in the presence of a wind above a predetermined velocity and the selected set of lights will be lighted to indicate safest direction for landing in the absence of a wind of the said predetermined velocity.

5. A lighting system for an airport having a plurality of sets of lights arranged to indicate wind direction including a set of lights arranged to indicate safest direction for landing with wind below a predetermined minimum velocity and a plurality of flood lights, comprising circuits for each set of lights, a separate relay controlling the circuits for each set, a circuit for energizing each relay, a pair of relays of the slow to release type with associated control elements interposed in the circuits for energizing the first mentioned relays, circuits for the pair of relays, a wind vane, means operated by the wind vane for selectively closing the circuits for energizing the relays controlling the wind direction indicating sets of lights, an anemometer, means operated by the anemometer for opening and closing the circuits for the pair of relays of the slow to release type alternately with a frequency responsive to the wind velocity whereby the set of lights to indicate proper landing direction under prevailing wind conditions is lit, selectively controllable circuits for the flood lights, relays controlling said circuits, and circuits for energizing the last mentioned relays interconnected with the other relay circuits of the system, for selective joint control by the anemometer and the wind vane.

6. A lighting system for an airport having a plurality of sets of wind direction indicating lights and a plurality of flood lights, comprising selectively controllable circuits for the flood lights, a separate relay for controlling each flood light circuit, circuits for each set of the wind direction indicating lights, a separate relay for controlling the circuits for each set, a wind vane interposed in the circuits of the relays controlling the wind direction indicating lights, means operated by the wind vane for selectively closing said latter relay circuits, a plurality of relays of the slow to release type having control elements interposed in the circuits for the flood light relays and the wind direction indicating relays, circuits for said plurality of relays of the slow to release type, an anemometer and means associated therewith for successively closing said last mentioned circuits responsive to wind velocity whereby a set of lights will be lighted to indicate the direction of the wind in the presence of a wind above a predetermined velocity and selected flood lights will be lighted.

7. A lighting system for an airport having a plurality of sets of wind direction indicating lights and a plurality of flood lights comprising selectively controllable circuits for the flood lights, a separate relay for controlling each flood light circuit, circuits for each set of the wind direction indicating lights, a separate relay for controlling the circuits for each set, a wind vane interposed in the circuits of the relays controlling the wind direction indicating lights, means operated by the wind vane for selectively closing said relay circuits, a plurality of relays of the slow to release type having control elements interposed in the circuits for the flood light relays and the wind direction indicating relays, circuits for said plurality of relays of the slow to release type, an anemometer and means associated therewith for successively closing said last mentioned circuits responsive to wind velocity whereby a set of lights will be lighted to indicate the direction of the wind in the presence of a wind above a predetermined velocity and selected flood lights will be lighted, and a master control means for all said relay circuits.

8. A lighting system for an airport having a plurality of sets of wind direction indicating lights and a plurality of flood lights comprising selectively controllable circuits for the flood lights, a separate relay for controlling each flood light circuit, circuits for each set of the wind direction indicating lights, a separate relay for controlling the circuits for each set, a wind vane interposed in the circuits of the relays controlling the wind direction indicating lights, means operated by the wind vane for selectively closing said relay circuits, a plurality of relays of the slow to release type having control elements interposed in the circuits for the flood light relays and the wind direction indicating relays, circuits for said plurality of relays of the slow to release type, an anemometer and means associated therewith for successively closing said last mentioned circuits responsive to wind velocity whereby a set of lights will be lighted to indicate the direction of the wind in the presence of a wind above a predetermined velocity and selected flood lights will be lighted, a master control means for all said relay circuits, and circuit closing means associated with the relays controlling the flood light circuits for establishing a holding circuit through one of said relays when the master control circuit is closed and one of said relays energized.

9. A lighting system for an airport having a plurality of flood lights and a set of lights indicating safest direction for landing with a wind blowing below a predetermined minimum velocity comprising selectively controllable circuits for the flood lights, a separate relay controlling each of the flood light circuits, circuits for the direction indicating lights, a separate relay controlling the circuits for the direction indicating lights, a plurality of relays of the slow to release type with control elements interconnected with the circuits for the beforementioned relays, an anemometer and means operated thereby for successively energizing said last mentioned relays responsive to wind velocity, whereby selected flood lights and the set of lights indicating safest direction for landing are lighted in the presence of a wind below a predetermined minimum velocity.

GURDON H. WILLIAMS.